United States Patent [19]
Johnson

[11] Patent Number: 4,678,953
[45] Date of Patent: Jul. 7, 1987

[54] MOTOR MOUNT ASSEMBLY

[76] Inventor: Raymond A. Johnson, Box 100, Agema, Saskatchewan, Canada, S0C 1Y0

[21] Appl. No.: 867,458

[22] Filed: May 28, 1986

[30] Foreign Application Priority Data

Jun. 3, 1985 [CA] Canada ................................. 483027

[51] Int. Cl.$^4$ ............................................ H02K 5/00
[52] U.S. Cl. ........................................ 310/91; 310/66; 193/9
[58] Field of Search ....................... 310/66, 91; 193/9; 248/560, 637, 639, 646, 660, 672, 673

[56] References Cited

U.S. PATENT DOCUMENTS

| | | | |
|---|---|---|---|
| 1,694,868 | 12/1928 | Sawyer | 310/91 X |
| 1,868,533 | 7/1932 | Johnson | 310/91 |
| 2,300,879 | 11/1942 | Eley | 310/91 |
| 2,525,173 | 10/1950 | Gerhardt | 310/91 |
| 2,603,983 | 7/1952 | Rieser | 310/91 UX |

Primary Examiner—Mark O. Budd
Attorney, Agent, or Firm—Stanley G. Ade

[57] ABSTRACT

It is conventional to use an electric motor for each device requiring such a drive even although only one such device may be used at one time, because it is inconvenient and time consuming to disconnect the motor and re-connect same to another device. The present invention enables a single electric motor to be used on a plurality of devices and is easily changed from one to another. The device consists of a base plate secured in the correct position on each of the devices. The single motor is mounted on a support plate having a pivot shaft at the rear thereof easily attached and detached to pivotal action, to one side of any of the base plates and having a compression spring reacting between the front of the support plate and the device to urge the support plate and the motor upwardly to supply sufficient tension to a drive belt operatively extending between the motor and the device upon which the motor is detachably secured.

12 Claims, 5 Drawing Figures

MOTOR MOUNT ASSEMBLY

BACKGROUND OF THE INVENTION

This invention relates to new and useful improvements in motor mount assemblies, and although it is designed specifically for use on various types of grain augering devices, nevertheless it will be appreciated that it may of course be used on other devices requiring an electric motor for the drive force.

Auger assemblies such as grain augers, bin unloading augers, transfer augers and the like are usually provided with an individual motor for each unit. However, it is normal to require the use of only one such device at a time so that it is relatively expensive to provide motors for each device.

Although a single motor may be used, nevertheless it is time consuming and awkward to unbolt a motor from one device and attach it to another.

Furthermore, when transfer augers are being used, it is often desirable to replace a 110 V electric motor with a 12 V motor and vice versa.

Another disadvantage with conventional devices is that when an unloading auger is connected to a grain truck, the motor is easily stolen when the truck is unattended.

SUMMARY OF THE INVENTION

The present invention overcomes all of these disadvantages by utilizing a single motor which is easily connected and disconnected from a base plate secured permanently to the device upon which it is required.

For example if a plurality of unloading bin augers are provided, it is relatively easy to attach the motor from one bin auger and attach it to another bin auger.

Also when the motor is being used for truck unloading, a 12 V motor may be provided on a support plate which is easily substituted for a 110 V motor on a similar support plate and vice versa. Furthermore, neither of these motors is easily removed from the unloading auger assembly in the truck and stored in a lock box or in the cab which may also be locked thus preventing unauthorized removal thereof.

In accordance with the invention there is provided a motor mount assembly for driving devices such as grain augers, unloading augers, transfer augers and the like; comprising in combination a base plate secured to the device in operative position thereon, a motor support plate, means to attach and detach said support plate to said base plate for pivotal movement through an arc, and spring means operatively connected between said support plate and said device for urging said support plate in an arc away from said base plate.

A further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
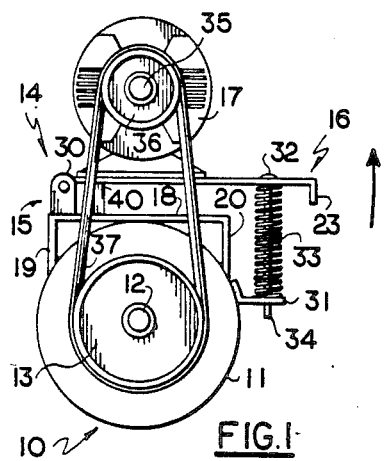
FIG. 1 is an end view of a grain auger tube assembly with the device secured thereto.

Proceeding therefore to describe the invention in detail, reference character 10 illustrates generally a conventional grain auger assembly consisting of the auger tube 11 and an auger shaft 12 supported within the ends and having a drive pulley 13 secured to the extending and portion of the auger shaft.

The invention collectively designated 14 consists of a base plate 15, a support plate assembly collectively designated 16 for supporting an electric motor 17.

The base plate 15 is a flat plate 18 having a down turned rear edge 19 and a corresponding down turned front edge 20 and is secured as by welding on the upper side of the auger casing 11 adjacent the end thereof that carries the drive pulley 13. The base plate is positioned so that the substantially rectangular plate portion 18 is horizontal when in position and it should be understood that such a base plate 15 is provided on each of the devices requiring drive by the electric motor 17.

Figure 5:
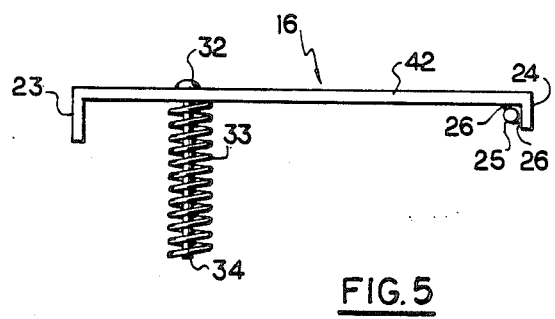
FIG. 5 is a side elevation of the support plate and spring assembly per se.

The support plate assembly 16 consists of a substantially rectangular plate 21 having the electric motor 17 bolted thereon through apertures 22. This plate 21 is also provided with a front down turned edge 23 and a rear down turned edge 24 (see FIG. 5) and this rear down turned edge engages over a support shaft 25 with the shaft nesting within the interior angle of the plate 18 and the down turned rear edge 24 with the shaft and plate being welded together as indicated by reference character 26.

Figure 2:
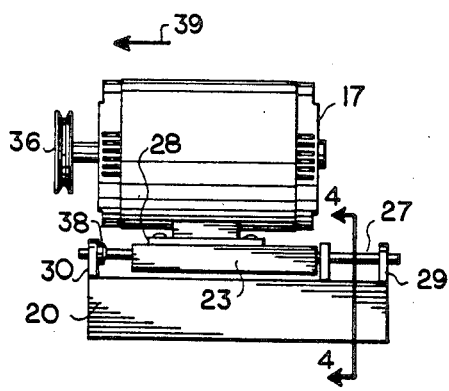
FIG. 2 is a view at right angles to FIG. 1 but showing the device removed from the grain auger.

The shaft is provided with end portions 27 extending upon each side edge 28 of the support plate 16 as shown in FIG. 2 and these extending portions are pivotally secured within upwardly extending spaced apart mounting brackets or lugs 29 and 30 extending upwardly from each side of the base plate 15 adjacent the rear edge thereof.

In conjunction with the base plate 15 permanently secured to the device such as the grain auger 10, there is provided a spring support lug 31 secured as by welding to the auger casing 11 and on one side thereof below the front down turned edge 20 of the base plate as clearly shown in FIG. 1. A mounting pin 32 is secured to the support plate 16 adjacent the front lip 23 thereof and extends downwardly therefrom surrounded by a relatively heavy duty compression spring 33 with the lower end 34 of the bolt extending freely through an aperture in the lug 31. The spring 33 reacts between the under side of the plate 21 and the lug 31 as clearly shown in FIG. 1.

The electric motor includes drive shaft 35 and belt pulley 36 secured thereon and a drive belt 37 extends around this pulley and around the auger pulley 13 when the device is connected as shown in FIG. 1 and is in the operative position with the spring 33 urging the support plate 16 and the electric motor 17, upwardly, with sufficient pressure to provide the necessary drive tension to belt 37. It will of course be appreciated that this arrangement permits pulleys 36 and 13 to be of slightly different diameters from one device to the other upon which the motor mount assembly may be used.

Figure 3:
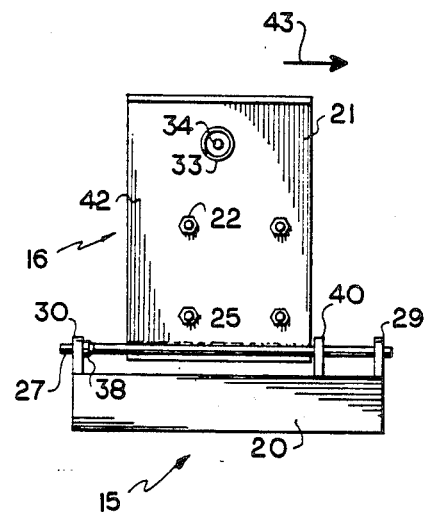
FIG. 3 is a view similar to FIG. 1 but showing the support plate and motor elevated for movement to disengage same from the base plate.
Figure 4:
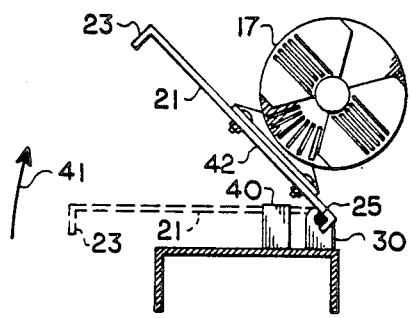
FIG. 4 is a view at right angles to FIG. 3.

To detach the mounting plate 16 together with the motor 17, from one base 15 so that it may be used upon another similar base, reference should be made to FIGS. 2, 3 and 4.

In FIG. 2 it will be noted that a washer 38 is welded to one of the extending portions 27 of the shaft 25 and is situated inboard of one of the mounting lugs 30 thus preventing endwise movement of the shaft and support plate 16 in a direction of arrow 39.

A small block 40 is secured to the base plate portion 18 and extends upwardly therefrom and when the device is in the operative position illustrated in FIGS. 1 and 2, the side edge of the support plate 16 abuts against this block 40 thus preventing movement of the shaft 25 and the support plate in a direction opposite to arrow 39.

When it is desired to remove the assembly from the base plate 15, the belt 37 is disengaged from the pulley 13 thus enabling the support plate 16 and the motor 17 to be pivoted upwardly in the direction of arrow 41 to a position shown in FIGS. 3 and 4. When in this position, it will be noted that the side edge 42 of the support plate 16 is now clear of the upper edge of block 40 so that the support plate, motor, and shaft 25 may now be moved in the direction opposite to arrow 39, namely, in the direction of arrow 43 shown in FIG. 3. This disengages the extending end 27 from the support lug 30 whereupon the shaft may be tipped upwardly slightly so that the entire assembly may now be moved in the direction of arrow 39 thus disengaging the opposite extending portion 27 of the shaft 25, from the other mounting lug 29.

A reversal of these movements of course may be used to assemble the support plate 16 together with motor 17, upon another base by engaging the opposite extending end 27 into the mounting lug 29, lowering the shaft in alignment with mounting lug 30 and moving the assembly in the direction of arrow 39 until the washer 38 abuts this mounting lug 30 whereupon the assembly is lowered so that the edge 42 of the support plate portion 21 now abuts the block 40 thus preventing endwise movement in either direction. At this point the belt can be engaged around the corresponding drive pulley 13 with the spring 33 urging the plate 16 and the motor 17 upwardly to supply sufficient belt tension.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A motor mount assembly for driving devices such as grain augers, unloading augers, transfer augers and the like; comprising in combination a base plate secured to the device in operative position thereon, a motor support plate, means to attach and detach said support plate to said base plate for pivotal movement through an arc, and spring means operatively connected between said support plate and said device for urging said support plate in an arc away from said base plate, said means to attach and detach said support plate to said base plate including a pair of spaced apart mounting means on said base plate, and a pivot shaft secured across said support plate, said pivot shaft having a portion extending upon each side edge of said support plate, said extending portions pivotally engaging said mounting means, means on said shaft limiting the endwise movement of said shaft and said support plate in one direction, and means on said base plate selectively limiting the movement of said shaft and said support plate in the other direction.

2. The assembly according to claim 1 in which said spring means takes the form of a compression spring strong enough to urge said plate and an associated electric motor mounted thereon, away from said base plate thus acting as a belt tensioning device.

3. The assembly according to claim 1 in which said means limiting movement of said support plate and said shaft in said one direction is secured to said shaft and abut against one of said mounting means when in the operative position, said means on said base plate abutting said support plate when in the operative position and disengaging from said support plate when said support plate is pivoted upwardly away from said base plate a predetermined amount thereby permitting endwise disengaging movement of said shaft from said one mounting means in said other direction and further endwise movement of said shaft from the other of said mounting means in said one direction.

4. The assembly according to claim 3 in which said means on said base plate abutting said support plate comprises a block secured to and extending upwardly from said base plate, the abutment of said support plate therewith occurring when said support plate is in the operative position relative to said base plate.

5. The assembly according to claim 3 in which said spring means takes the form of a compression spring strong enough to urge said plate and an associated electric motor mounted thereon, away from said base plate thus acting as a belt tensioning device.

6. The assembly according to claim 4 in which said spring means takes the form of a compression spring strong enough to urge said plate and an associated electric motor mounted thereon, away from said base plate thus acting as a belt tensioning device.

7. A motor mount assembly for driving devices such as grain augers, unloading augers, transfer augers and the like; comprising in combination a base plate secured to the device in operative position thereon, a motor support plate, an electric motor secured to said support plate, a belt pulley secured to the drive shaft of said motor and a belt extending around said pulley and around the pulley on said auger shaft when in the operative position, means to attach and detach said support plate and said electric motor relative to said base plate for pivotal movement through an arc, and spring means operatively connected between said support plate and said device for urging said support plate in an arc away from said base plate, said means to attach and detach said support plate to said base plate including a pair of spaced apart mounting means on said base plate, and a pivot shaft secured across said support plate, said pivot shaft having a portion extending upon each side edge of said support plate, said extending portions pivotally engaging said mounting means, means on said shaft limiting the endwise movement of said shaft and said support plate in one direction, and means on said base plate selectively limiting the movment of said shaft and said support plate in the other direction.

8. The assembly according to claim 7 in which said spring means takes the form of a compression spring strong enough to urge said plate and said motor away from said base plate thereby acting as a belt tensioning device.

9. The assembly according to claim 7 in which said means limiting movement of said support plate and said shaft in said one direction is secured to said shaft and abuts against one of said mounting means when in the operative position, said means on said base plate abutting said support plate when in the operative position and disengaging from said support plate when said support plate is pivoted upwardly away from said base plate a predetermined amount thereby permitting endwise disengaging movement of said shaft from said one mounting means in said other direction and further endwise movement of said shaft from the other of said mounting means in said one direction.

10. The assembly according to claim 9 in which said means on said base plate abutting said support plate comprises a block secured to and extending upwardly from said base plate, the abutment of said support plate therewith occurring when said support plate is in the operative position relative to said base plate.

11. The assembly according to claim 9 in which said spring means takes the form of a compression spring strong enough to urge said plate and an associated electric motor mounted thereon, away from said base plate thus acting as a belt tensioning device.

12. The assembly according to claim 10 in which said spring means takes the form of a compression spring strong enough to urge said plate and an associated electric motor mounted thereon, away from said base plate thus acting as a belt tensioning device.

* * * * *